United States Patent
Hwang et al.

(10) Patent No.: US 8,045,087 B2
(45) Date of Patent: Oct. 25, 2011

(54) LIQUID CRYSTAL DISPLAY DEVICE AND MOBILE COMMUNICATION TERMINAL HAVING THE SAME

(75) Inventors: Hyun Ha Hwang, Seoul (KR); Yong Gu Cho, Euiawang-si (KR)

(73) Assignee: LG Display Co., Ltd., Seoul (KR)

( * ) Notice: Subject to any disclaimer, the term of this patent is extended or adjusted under 35 U.S.C. 154(b) by 412 days.

(21) Appl. No.: 12/097,972

(22) PCT Filed: Dec. 21, 2006

(86) PCT No.: PCT/KR2006/005626
§ 371 (c)(1),
(2), (4) Date: Jun. 18, 2008

(87) PCT Pub. No.: WO2007/073100
PCT Pub. Date: Jun. 28, 2007

(65) Prior Publication Data
US 2008/0297680 A1    Dec. 4, 2008

(30) Foreign Application Priority Data
Dec. 21, 2005  (KR) ................. 10-2005-0126835

(51) Int. Cl.
*G02F 1/1333*  (2006.01)
(52) U.S. Cl. ............... 349/58; 349/60; 349/151
(58) Field of Classification Search .......... 349/58, 349/60, 96, 64, 65, 151; 361/679.09, 679.56; 362/633; 345/905; 455/566, 575.1
See application file for complete search history.

(56) References Cited

U.S. PATENT DOCUMENTS

| 5,929,950 | A | 7/1999 | Matsuda |
| 6,163,357 | A | 12/2000 | Nakamura |
| 2003/0020679 | A1 | 1/2003 | Kojima et al. |
| 2004/0246412 | A1* | 12/2004 | Kim et al. ................. 349/113 |
| 2006/0050195 | A1* | 3/2006 | Choi et al. ................. 349/58 |
| 2006/0139501 | A1* | 6/2006 | Lee et al. ................. 349/21 |

FOREIGN PATENT DOCUMENTS

| JP | 8220515 A | 8/1996 |
| KR | 20-1998-0064280 U | 11/1998 |
| KR | 10-2003-0039555 A | 5/2003 |

* cited by examiner

*Primary Examiner* — David Nelms
*Assistant Examiner* — Tai Duong
(74) *Attorney, Agent, or Firm* — Birch, Stewart, Kolasch & Birch, LLP

(57) ABSTRACT

Provided is an LCD device. The LCD device includes liquid crystal panel, a mold frame, and an impact absorbing member. The liquid crystal panel has a first substrate, a second substrate, and a liquid crystal layer interposed between the first and second substrates. The liquid crystal panel is seated on the mold frame. The impact absorbing member is formed between the liquid crystal panel and the mold frame.

8 Claims, 3 Drawing Sheets

[Fig. 1]
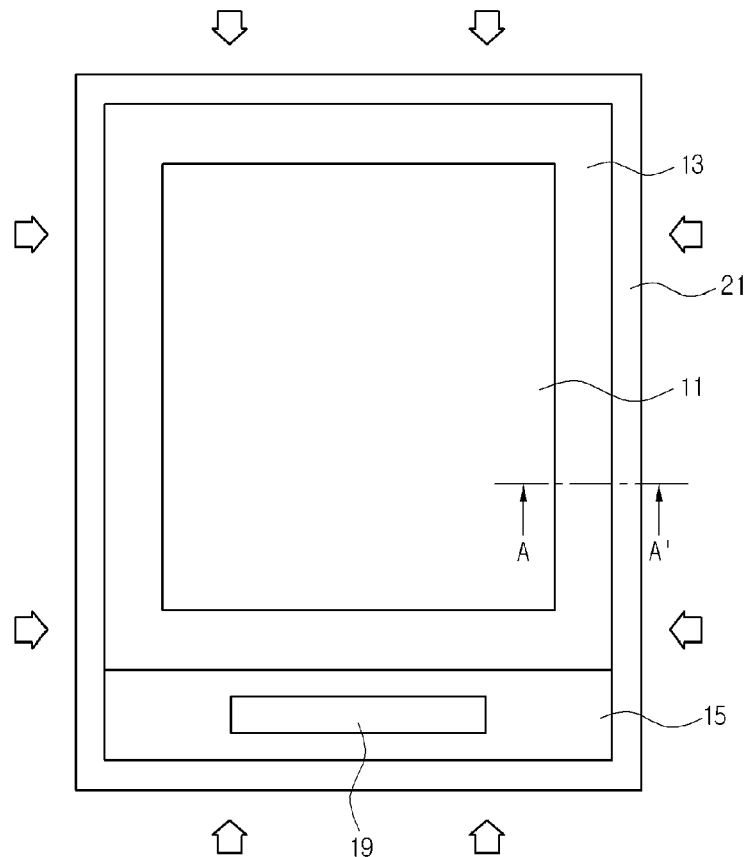
[Fig. 2]
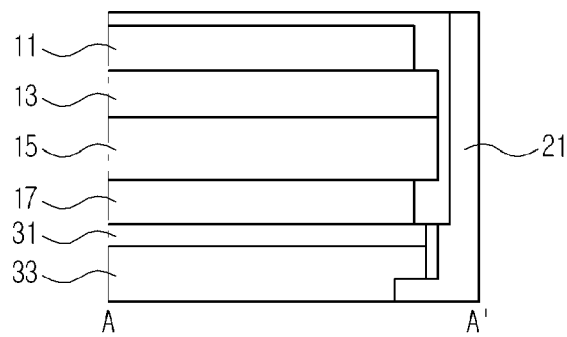
[Fig. 3]
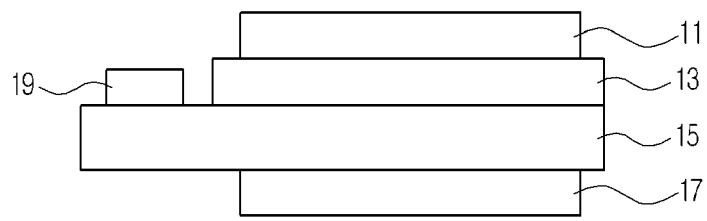

[Fig. 4]
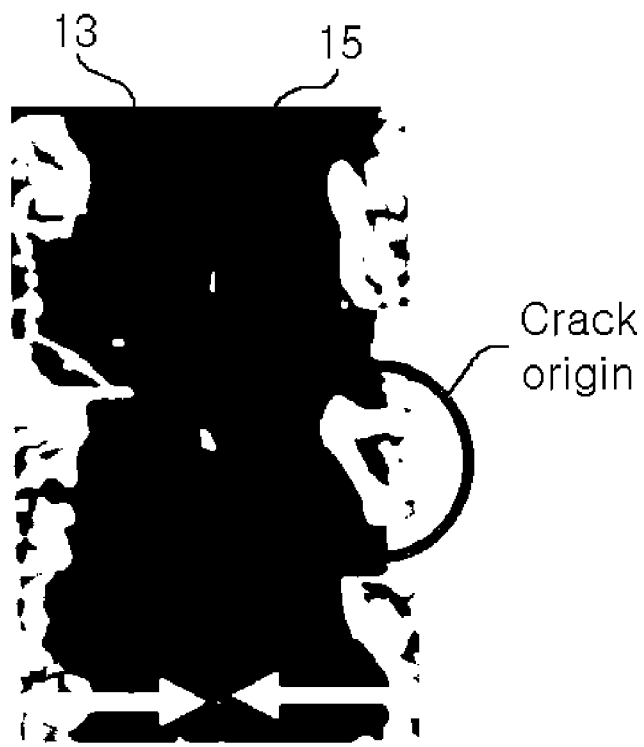
[Fig. 5]
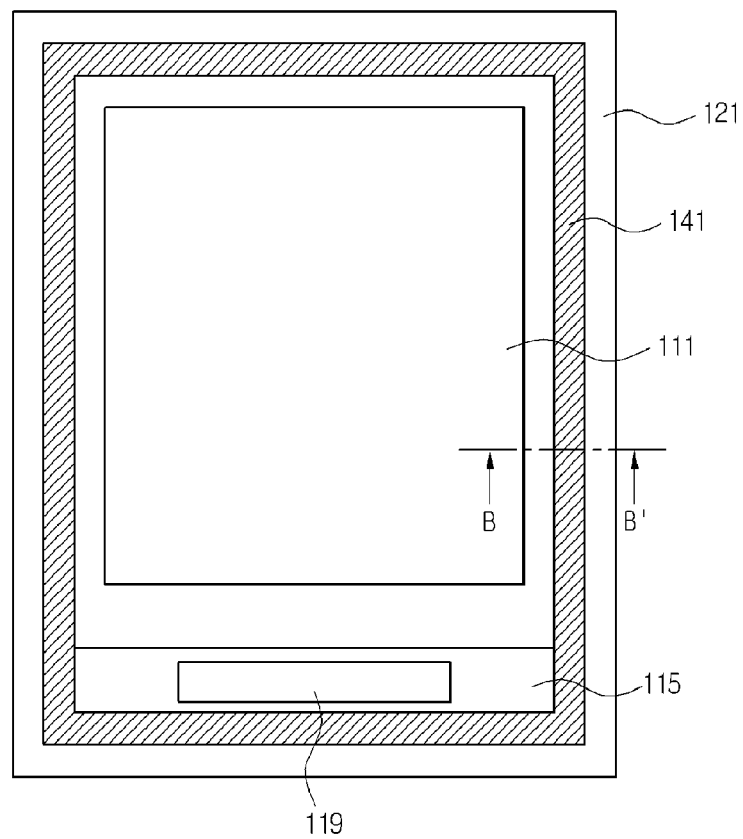

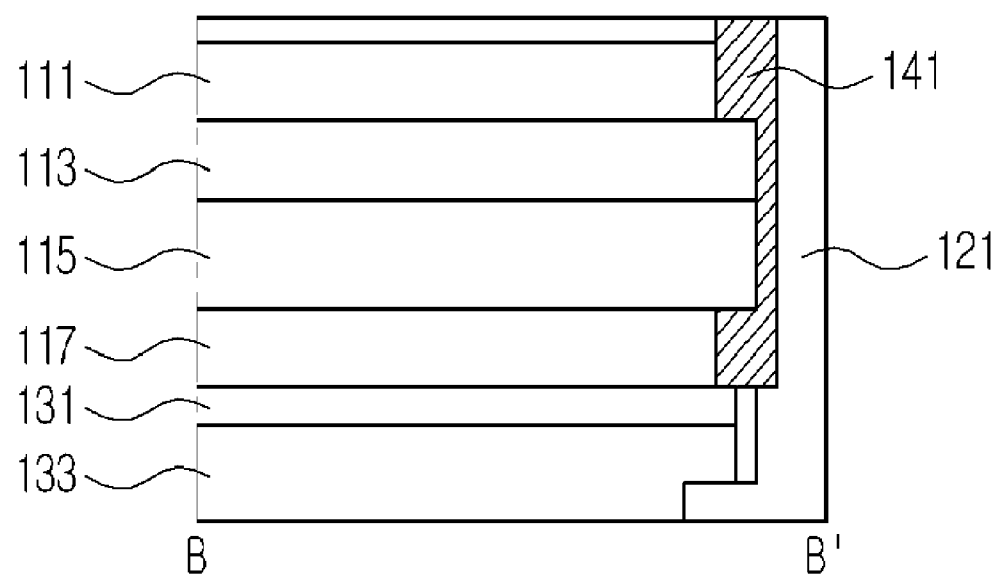

LIQUID CRYSTAL DISPLAY DEVICE AND MOBILE COMMUNICATION TERMINAL HAVING THE SAME

CROSS-REFERENCE TO RELATED APPLICATION

This application is the U.S. national stage application of International Patent Application No. PCT/KR2006/005626, filed Dec. 21, 2006, the disclosure of which is hereby incorporated by reference in its entirety.

TECHNICAL FIELD

The present invention relates to a liquid crystal display device and a mobile communication terminal having the same.

BACKGROUND ART

CRTs among screen display devices for displaying image data on a screen have been widely used. But the CRTs have a large volume and a heavy weight compared to their display area, which have been inconvenient.

Accordingly, thin flat display devices that have a slim profile and a large display area and thus can be easily used in any place have been developed and are gradually replacing CRTs. Particularly, liquid crystal display (LCD) devices have excellent display resolution compared to other flat display device and have fast response time that can be compared to that of CRTs when realizing a moving image.

A driving principle of the LCD device uses optical anisotropy and polarization characteristic of liquid crystal. Liquid crystal has a long and thin structure. Therefore, it is possible to control an alignment direction of liquid crystal molecules by artificially applying an electric field to the liquid crystal molecules having directionality and polarization in the molecular arrangement. Accordingly, when an alignment direction is arbitrarily controlled, light can be transmitted or blocked depending on an alignment direction of the liquid crystal molecules by optical anisotropy of the liquid crystal, so that color and an image can be displayed.

These LCD devices are applied to mobile communication terminals such as portable phones, camera phones, and personal digital assistants (PDAs). In an LCD device applied to a small-sized apparatus such as a mobile communication terminal, a thickness of a substrate constituting an LC panel is formed thin to achieve a slim profile and lightweight of an entire apparatus. For example, a substrate constituting an LC panel can be formed to have a thickness of 0.3-0.5 mm.

FIG. 1 is a schematic plan view of an LCD device according to a related art, FIG. 2 is a cross-sectional view taken along a line A-A' of FIG. 1, and FIG. 3 is a schematic side view of the LC panel illustrated in FIG. 1.

The related art LCD device includes an LC panel having a first substrate 13 and a second substrate 15, and a mold frame 21. A first polarizer 11 is attached on the first substrate 13, and a second polarizer 17 is attached under the second substrate 15. The first substrate 13 is smaller than the second substrate 15. A driving integrated circuit (IC) 19 for driving the LC panel can be formed on the second substrate 15. The first polarizer 11 and the second polarizer 17 are formed in a similar size smaller than sizes of the first and second substrates 13 and 15. The first polarizer 11 and the second polarizer 17 are formed larger than an image display region of the LC panel.

The first and second substrates 13 and 15, an optical sheet 31, and a light guide plate 33 are coupled to the mold frame 21. The light guide plate 33 and the optical sheet 31 receive light emitted from a light source and provide the received light onto the LC panel.

In an LCD device having the above-described structure, an LC panel may be destroyed by mechanical twisting and impact while an apparatus is treated and carried as the apparatus has an extremely slim profile and lightweight. The arrow illustrated in FIG. 1 indicates impacts are applied to an LCD device from the outside. This external impact is applied to the mold frame 21, and the applied impact is not completely absorbed by the mold frame 21. Therefore, the impact that has not been completely absorbed by the mold frame is delivered to the LC panel.

Meanwhile, the LC panel is separated from a mother substrate through a scribing process and a breaking process during its manufacturing process. At this point, referring to FIG. 4, a fine crack origin is created in a substrate while physical scribing and breaking processes are performed. FIG. 4 is an image illustrating a crack origin is formed in a substrate of a related art LC panel.

The fine crack origin may act as a starting point from which an LCD device starts to be destroyed when twisting and impact are applied to an LC panel. Therefore, it is required that an LCD device applied to a small-sized apparatus of a slim profile and lightweight has impact resistance.

DISCLOSURE OF INVENTION

Technical Problem

An embodiment of the present invention provides a liquid crystal display device capable of protecting a liquid crystal panel from an external impact, and a mobile communication terminal having the same.

Technical Solution

An embodiment of the present invention provides a liquid crystal display device including: a liquid crystal panel having a first substrate, a second substrate, and a liquid crystal layer interposed between the first and second substrates; a mold frame on which the liquid crystal panel is seated; and an impact absorbing member formed between the liquid crystal panel and the mold frame.

An embodiment of the present invention provides a mobile communication terminal including: a liquid crystal display device having a liquid crystal panel, a mold frame on which the liquid crystal panel is seated, an impact absorbing member formed between the liquid crystal panel and the mold frame; a communication element for performing communication with an outside; and a controller for controlling the communication element and the liquid crystal display device.

Advantageous Effects

According to a liquid crystal display device of an embodiment of the present invention and a mobile communication terminal having the same, damage of a liquid crystal panel caused by an external impact is prevented, and an influence of external moisture and dusts on the liquid crystal panel can be efficiently blocked.

BRIEF DESCRIPTION OF THE DRAWINGS

FIG. 1 is a schematic plan view of an LCD device according to a related art.

FIG. 2 is a cross-sectional view taken along a line A-A' of FIG. 1.

FIG. 3 is a schematic side view of the LC panel illustrated in FIG. 1.

FIG. 4 is an image illustrating a crack origin is formed in a substrate of a related art LC panel.

FIG. 5 is a schematic plan view of an LCD device according to an embodiment of the present invention.

FIG. 6 is a cross-sectional view taken along a line B-B' of FIG. 5.

MODE FOR THE INVENTION

It will be understood that when a layer (or film), a region, patterns, or a structure is referred to as being 'on' or 'under' another layer (or film), region, or patterns, it can be directly on the other layer (or film), region, or patterns, or intervening layers may also be present.

An embodiment of the present invention will be described below in detail with reference to the accompanying drawings.

FIG. 5 is a schematic plan view of an LCD device according to an embodiment of the present invention, and FIG. 6 is a cross-sectional view taken along a line B-B' of FIG. 5.

Referring to FIGS. 5 and 6, the LCD device includes an LC panel having a first substrate 113 and a second substrate 115, a mold frame 121, and an impact absorbing member 114. An LC layer is interposed between the first substrate 113 and the second substrate 115. A first polarizer 111 is formed on the first substrate 113, and a second polarizer 117 is formed under the second substrate 115.

The LC panel is coupled to the mold frame 121. The impact absorbing member 141 is formed between the LC panel and the mold frame 121. Also, the impact absorbing member 141 can be formed between the first polarizer 111 formed on an outer surface of the first substrate 113 and the mold frame 121 and between the second polarizer 117 formed on an outer surface of the second substrate 115 and the mold frame 121.

The first substrate 113 is formed smaller than the second substrate 115. A driving IC 119 for driving the LC panel can be formed on the second substrate 115. The second substrate 115 can be a thin film transistor substrate where gate lines, data lines, and a thin film transistor (TFT) array are formed. The first substrate 113 can be a color filter substrate where color filters are formed.

The impact absorbing member 141 can be formed of a flexible synthetic resin. The impact absorbing member 141 can be formed of at least one material selected from the group including silicon, Ethylene-Vinyl Acetate copolymer, and polyurethane.

An optical sheet 131 and a light guide plate 133 are coupled to the mold frame 121. The light guide plate 133 and the optical sheet 131 receive light emitted from a light source and provide the received light onto the LC panel.

The LCD device having the above-described structure includes the impact absorbing member 141 formed between the LC panel and the mold frame 121. Therefore, impacts applied from the outside can be effectively absorbed by the impact absorbing member 141. Accordingly, transfer of the impacts applied from the outside to the LC panel can be blocked, so that destruction of the LC panel due to the external impact can be prevented.

According to an embodiment of the present invention, it is possible to prevent a fine crack origin created between the first and second substrates 113 and 115 during physical scribing and breaking processes when the LC panel is manufactured, from being directly exposed to external impacts. Therefore, it is possible to reduce destruction of the LC panel caused by the external impacts.

Also, according to an embodiment of the present invention, the impact absorbing member 141 is located along outer peripheries of the first and second substrates 113 and 115. The impact absorbing member 141 absorbs impacts applied from the outside and can effectively block an influence of external moisture or dusts on the LC panel. The impact absorbing member 141 can also prevent dusts and moisture from the outside from having an influence on the optical sheet 131 and the light guide plate 133.

Though description has been made for the case where the polarizer as an optical film is formed on and under the LC panel, a phase difference compensating plate and a brightness enhancement film, besides the polarizer, can be applied on or under the LC panel. An example of the brightness enhancement film includes Dual Brightness Enhanced Film (DBEF). The optical film can be designed to be attached on at least one of outer surfaces of the first substrate and the second substrate constituting the LC panel.

The above-described LCD device can be applied to mobile communication terminal such as portable phones, camera phones, and PDAs. The mobile communication terminals include the above-described LCD device, a communication element for communicating with the outside, and a controller for controlling the communication element and an image displaying operation of the LCD device. Since respective elements constituting the mobile communication terminal and functions thereof are already well known in the art, detailed description thereof are omitted.

INDUSTRIAL APPLICABILITY

According to an LCD device of an embodiment of the present invention and a mobile communication terminal having the same, damage of a liquid crystal panel caused by an external impact is prevented, and an influence of external moisture and dusts on the liquid crystal panel can be efficiently blocked.

The invention claimed is:

1. A liquid crystal display device comprising:
    a liquid crystal panel having a first substrate, a second substrate, and a liquid crystal layer interposed between the first and second substrates, a first polarizer attached on the first substrate and a second polarizer attached under the second substrate;
    a mold frame on which the liquid crystal panel is seated;
    a light guide plate coupled to the mold frame;
    an optical sheet between the light guide plate and the second polarizer; and
    an impact absorbing member formed between the liquid crystal panel and the mold frame, wherein the impact absorbing member is disposed at a side of the first substrate, a side of the second substrate, a side of the first polarizer and a side of the second polarizer,
    wherein the optical sheet contacts a bottom surface of the second polarizer and a portion of the impact absorbing member between the second polarizer and the mold frame.

2. The liquid crystal display device according to claim 1, wherein the impact absorbing member is formed of a flexible synthetic resin.

3. The liquid crystal display device according to claim 1, wherein the impact absorbing member is formed of at least one material selected from the group including silicon, Ethylene-Vinyl Acetate copolymer, and polyurethane.

4. The liquid crystal display device according to claim 1, comprising a driving integrated circuit formed on the liquid crystal panel to drive the liquid crystal panel.

5. A mobile communication terminal comprising:
a liquid crystal display device having a liquid crystal panel, a mold frame on which the liquid crystal panel is seated, a light guide plate coupled to the mold frame, an optical sheet on the light guide plate, and an impact absorbing member formed between the liquid crystal panel and the mold frame,
wherein the liquid crystal panel includes a first substrate, a second substrate, a liquid crystal layer interposed between the first and second substrates, a first polarizer attached on the first substrate and a second polarizer attached under the second substrate,
wherein the impact absorbing member is disposed at a side of the first substrate, a side of the second substrate, a side of the first polarizer and a side of the second polarizer, and
wherein the optical sheet contacts a bottom surface of the second polarizer and a portion of the impact absorbing member between the second polarizer and the mold frame.

6. The mobile communication terminal according to claim 5, wherein the impact absorbing member is formed of a flexible synthetic resin.

7. The mobile communication terminal according to claim 5, wherein the impact absorbing member is formed of at least one material selected from the group including silicon, Ethylene-Vinyl Acetate copolymer, and polyurethane.

8. The mobile communication terminal according to claim 5, comprising a driving integrated circuit formed on the liquid crystal panel to drive the liquid crystal panel.

* * * * *